United States Patent [19]

Hahn et al.

[11] 4,298,702

[45] Nov. 3, 1981

[54] PROCESS FOR THE MANUFACTURE OF FLAME RETARDANT POLYSTYRENE FOAMS

[75] Inventors: Klaus Hahn, Lampertheim; Klaus Hinselmann, Mutterstadt; Klaus Halbritter, Mannheim; Walter Rebafka, Eppelheim; Heinz Weber, Gruenstadt, all of Fed. Rep. of Germany

[73] Assignee: BASF Aktiengesellschaft, Ludwigshafen, Fed. Rep. of Germany

[21] Appl. No.: 175,157

[22] Filed: Aug. 4, 1980

[30] Foreign Application Priority Data

Aug. 9, 1979 [DE] Fed. Rep. of Germany ....... 2923403

[51] Int. Cl.³ .............................................. C08V 9/14
[52] U.S. Cl. .................................. 521/79; 260/23 S; 260/45.75 T; 260/DIG. 24; 521/93; 521/98; 521/907
[58] Field of Search ........................... 521/907, 93, 79; 260/45.75 T

[56] References Cited

U.S. PATENT DOCUMENTS

| | | | |
|---|---|---|---|
| 2,590,211 | 3/1952 | Rugar | 260/45.75 B |
| 2,924,532 | 2/1960 | Dereich | 260/DIG. 24 |
| 4,089,912 | 5/1978 | Levek et al. | 260/45.75 T |
| 4,113,672 | 9/1978 | Pillar | 521/93 |

Primary Examiner—Morton Foelak
Attorney, Agent, or Firm—H. Lawrence Jones

[57] ABSTRACT

This invention relates to a process of making flame-retardant polystyrene foams by an extrusion process in which a stabilizer of a dialkyl-tin carboxylate or a mixture of a dialkyl tin carboxylate and a barium and/or cadmium carboxylate is added to the extrusion melt.

10 Claims, No Drawings

PROCESS FOR THE MANUFACTURE OF FLAME RETARDANT POLYSTYRENE FOAMS

BACKGROUND OF THE INVENTION

1. Field of the Invention

This invention relates to a process for the manufacture of flame-retardant polystyrene foams in which a stabilizer of a dialkyl-tin carboxylate or a mixture of a dialkyl-tin carboxylate and a barium and/or cadmium carboxylate is added to the extrusion mixture.

2. Description of the Prior Art

Flame-retardant polystyrene foams are produced by a well known method of melting the plastic material in an extruder, mixing it with a volatile blowing agent, extruding the mixture into the surrounding atmosphere and cooling the foam. By adding organic halogen compounds, such foams are usually self-extinguishing. Most of the halogen compounds tend to decompose at temperatures above 200° C. If the extrusion temperature, which is normally 180° C. to 200° C., is to be raised so that the throughput of the extruder can be increased, discoloration and thermal dosage of the foam from the decomposition products of the flame retardant may result.

SUMMARY OF THE INVENTION

The object of this invention is to stabilize an extrusion system so that higher extrusion temperatures become possible without damaging the foam. This object is met by adding 0.1 weight percent to 5 weight percent based on the weight of polystyrene of a dialkyl tin carboxylate to the styrene polymer. In a preferred version, 0.01 weight percent to 5 weight percent based on the weight of polystyrene of a barium and/or cadmium carboxylate are also added.

DESCRIPTION OF THE PREFERRED EMBODIMENTS

In a process for the manufacture of a flame-retardant polystyrene foam by melting polystyrene in an extruder, mixing the polystyrene with 5 weight percent to 20 weight percent, based on the weight of polystyrene, of a volatile blowing agent and 0.5 weight percent to 10 weight percent, based on the weight of polystyrene, of an organic halogen compound, extruding the mixture into the surrounding atmosphere, and subsequently cooling the foam, the improvement which comprises adding from 0.01 weight percent to 5 weight percent, based on the weight of polystyrene, of a dialkyl-tin carboxylate to the mixture.

In a preferred embodiment of the invention, 0.01 weight percent to 5 weight percent, based on the weight of polystyrene, of a barium and/or cadmium carboxylate is added to the mixture.

In another preferred embodiment, the dialkyl-tin carboxylate is dibutyltin dilaurate.

In another preferred embodiment, the dialkyl-tin carboxylate is dibutyltin maleate.

In another preferred embodiment, the cadmium carboxylate is cadmium stearate.

In another preferred embodiment, the barium carboxylate is barium stearate.

In another preferred embodiment, the cadium carboxylate is cadmium palmitate.

In another preferred embodiment, the barium carboxylate is barium palmitate.

In another preferred embodiment, 0.05 weight percent to 1 weight percent, based on the weight of polystyrene, of the dialkyl-tin carboxylate is added to the mixture.

In another preferred embodiment, 0.05 weight percent to 1 weight percent, based on the weight of polystyrene, of a barium and/or cadmium carboxylate is added to the mixture.

In addition to polystyrene, also used as polystyrene are polymers of styrene mixed with up to 50 percent of comonomers such as alphamethylstyrene, acrylonitrile, or esters of acrylic or methacrylic acid, as well as rubbers modified to be impact resistant with polystyrene.

Suitable blowing agents are aliphatic hydrocarbons such as butane, pentane or hexane, but preferably those which are soluble in the polymer only under pressure such as methylene chloride, fluorinated hydrocarbons or carbon dioxide. Mixtures of blowing agents may also be used.

The blowing agent is used in amounts of from 5 weight percent to 20 weight percent, preferably 8 weight percent to 15 weight percent, based on the weight of the polystyrene.

Suitable flame retardants are preferably those halogen compounds which are stable at high temperatures such as hexabromocyclododecane, pentabromomonochlorocyclohexane, and chloroparaffin. The flame retardants are added in amounts of from 0.5 weight percent to 10 weight percent, preferably 1 weight percent to 5 weight percent, based on the weight of the polystyrene.

Commonly used additives such as nucleation agents for controlling the cell size, dyes, fillers and flame protection synergists may also be added.

In accordance with the invention, 0.01 weight percent to 5 weight percent, based on the weight of the polystyrene, of a dialkyl tin carboxylate is added as stabilizer. This tin compound preferably has the general formula

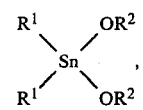

In this formula, $R^1$ denotes an alkyl radical with 1 carbon atom to 6 carbon atoms, and $R^2$ is a fatty acid radical having 2 carbon atoms to 25 carbon atoms and the two $R^2$ radicals may also originate from a corresponding dicarboxylic acid. Particularly preferred are dibutyltin dilaurate and dibutyltin maleate. The amount of tin compound to be added depends upon the quantity of the applied halogen compound. Preferably 0.05 weight percent to 1 weight percent of tin compound is added, based on the weight of the polystyrene.

According to a preferred version of the invention, 0.01 weight percent to 5 weight percent, preferably 0.05 weight percent to 1 weight percent, based on the weight of polystyrene, of a barium and/or cadmium carboxylate is added in addition to the tin compound with the former preferably having been derived from a mono- or dicarboxylic acid having 5 carbon atoms to 20 carbon atoms, preferably palmitates, stearates, or salts of dodecanedioic acid.

The stabilizers are advantageously added to the polystyrene melt with the halogen compound and the blowing agent. Mixing normally takes place at temperatures between 180° C. and 250° C., preferably between 200° C. and 240° C., using common single- or double-shaft extruders. The mixture is extruded through a nozzle whereupon the blowing agent evaporates and expands the plastic. The result is a foam, the cross-section of which may be round or square depending upon the form of the nozzle. The foam stabilizes by cooling.

The following examples will further illustrate the various aspects of the invention. These examples, however, are not to be considered as limiting the invention. Where not otherwise specified through this specification and claims, temperatures are in degrees centigrade, and parts, percentages and proportions are by weight.

EXAMPLES 1-10

Polystyrene, together with 12 percent of a blowing agent mixture consisting of 70 parts of dichlorodifluoromethane and 30 parts methylene chloride, 1 percent talcum as nucleating agent, in each case based on the weight of polystyrene, as well as various amounts of various flame retardants and stabilizers were melted in a single-shaft extruder and were extruded through a broad, flat nozzle. The throughput was 80 kilograms per hour, the mass temperature in the extruder was 210° C. to 230° C. The resultant foam panels were about 60 millimeters × 200 millimeters and had densities of 30 grams per liter to 40 grams per liter. The following were used as flame retardants:

A. Pentabromomonochlorocyclohexane,
B. Chloroparaffin,
C. Hexabromocyclododecane.

The following stabilizers were used:

$X_1$: Dibutyltin dilaurate,
$X_2$: Dibutyltin maleate,
$Y_1$: Cadmium stearate,
$Y_2$: Barium stearate,
$Y_3$: Cadmium palmitate,
$Y_4$: Barium palmitate.

The results are presented in Table 1 below. As the data indicate, foams made containing flame retardants with stabilizers of this invention show little or no discoloration, therefore, little or no thermal damage from the decomposition products of the flame retardant. The foams made containing flame retardants without stabilizers, however, at even lower extrusion temperature, are blackened, which indicates that the foams have been damaged.

TABLE 1

| Example | Flame Retardant (wt. %) | Stabilizer (wt. %) | Temperature (°C.) | Color of the Foam |
|---|---|---|---|---|
| 1 | 1.6 A | — | 210 | Grayish-Black |
| 2 | 1.6 A | 0.1 $X_2$ 0.03 $Y_1$ 0.03 $Y_2$ | 230 | White |
| 3 | 3.0 B | — | 210 | Black |
|  |  | 0.15 $X_1$ |  |  |

TABLE 1-continued

| Example | Flame Retardant (wt. %) | Stabilizer (wt. %) | Temperature (°C.) | Color of the Foam |
|---|---|---|---|---|
| 4 | 3.0 B | 0.07 $Y_3$ 0.07 $Y_4$ | 230 | White |
| 5 | 3.0 B 1.0 C | — | 210 | Black |
| 6 | 3.0 B 1.0 C | 0.4 $X_2$ | 210 | White |
| 7 | 3.0 B 1.0 C | 0.4 $X_1$ | 220 | Weak gray |
| 8 | 3.0 B 1.0 C | 0.3 $X_1$ 0.1 $Y_1$ | 220 | White |
| 9 | 3.0 B 1.0 C | 0.3 $X_1$ 0.3 $Y_1$ | 230 | Weak gray |
| 10 | 3.0 B 1.0 C | 0.3 $X_1$ 0.05 $Y_1$ 0.05 $Y_2$ | 230 | White |

The embodiments of this invention in which an exclusive privilege or property is claimed are as defined as follows:

1. In a process for the manufacture of a flame-retardant polystyrene foam by melting polystyrene in an extruder, mixing the polystyrene at a temperature over 180° C. with 5 weight percent to 20 weight percent, based on the weight of polystyrene, of a volatile blowing agent and 0.5 weight percent to 10 weight percent, based on the weight of polystyrene, of an organic halogen compound extruding the mixture into the surrounding atmosphere, and subsequently cooling the foam, the improvement which comprises adding from 0.01 weight percent to 5 weight percent, based on the weight of polystyrene, of a dialkyl-tin carboxylate, and 0.01 weight percent to 5 weight percent, based on the weight of polystyrene, of a barium and/or cadmium carboxylate to the mixture.

2. The process of claim 1 in which the dialkyl-tin carboxylate is dibutyltin dilaurate.

3. The process of claim 1 in which the dialkyl-tin carboxylate is dibutyltin maleate.

4. The process of claim 1 in which the cadmium carboxylate is cadmium stearate.

5. The process of claim 1 in which the barium carboxylate is barium stearate.

6. The process of claim 1 in which the cadmium carboxylate is cadmium palmitate.

7. The process of claim 1 in which the barium carboxylate is barium palmitate.

8. The process of claim 1 in which 0.05 weight percent to 1 weight percent, based on the weight of polystyrene, of the dialkyl tin carboxylate, and 0.05 weight percent to 1 weight percent, based on the weight of polystyrene of a barium and/or cadmium carboxylate is added.

9. The process of claim 1 in which about 0.1 to 0.3 weight percent dialkyltin carboxylate, 0.03 to 0.07 weight percent of a cadmium carboxylate and 0.03 to 0.07 weight percent of a barium carboxylate are added to the mixture as a stabilizer.

10. The process of claim 1 in which about 0.3 weight percent dialkyltin carboxylate and about 0.1 weight percent cadmium carboxylate is added.

* * * * *